United States Patent [19]

Shibue et al.

[11] Patent Number: 5,032,902
[45] Date of Patent: Jul. 16, 1991

[54] PLAYBACK COLOR PROCESSING CIRCUIT

[75] Inventors: Shigenori Shibue; Junichi Nose, both of Nagaokakyo, Japan

[73] Assignee: Mitsubishi Denki Kabushiki Kaisha, Tokyo, Japan

[21] Appl. No.: 375,500

[22] Filed: Jul. 5, 1989

[30] Foreign Application Priority Data

Jul. 22, 1988 [JP] Japan ................... 63-184035

[51] Int. Cl.$^5$ ................... H04N 9/64; H04N 5/213
[52] U.S. Cl. ................... 358/36; 358/40; 358/21 R; 358/167; 358/329
[58] Field of Search ................... 358/19, 31, 40, 17, 358/326, 329, 328, 310, 20, 21 R, 340, 335, 36, 37, 167

[56] References Cited

U.S. PATENT DOCUMENTS

| Re. 31,326 | 7/1983 | Amery et al. ................... 358/326 |
| 4,754,340 | 6/1988 | Nakagawa et al. ............... 358/326 |
| 4,849,808 | 7/1989 | Rossi ........................... 358/31 |
| 4,930,005 | 5/1990 | Yamada et al. .................. 358/36 |

FOREIGN PATENT DOCUMENTS 3819010  3/1988  Fed. Rep. of Germany .
0321312  6/1989  Japan .

OTHER PUBLICATIONS

"Technik der magnetischen Videosignalaufzeichnung" to Von Prof. Dr.-Ing. B. Morgenstern, Universität der Bundeswehr Hamburg, B. G. Teubner Stuttgart 1985.
Japanese patent application Kokai Publication No. 56-9073 to Hirota, 1981.
Japanese patent application Kokai Publication 60-51390 to Matsuo et al., 1985.

Primary Examiner—Howard W. Britton
Assistant Examiner—Michael H. Lee

[57] ABSTRACT

A playback color processing circuit for a video tape recorder includes an automatic phase control loop and has two comb filters. A first comb filter. A contains a single 1H delay line for canceling adjacent/track crosstalk in the automatic phase control loop. Further, a second comb filter contains two 1H delay lines for canceling adjacent-track crosstalk in the chrominance output signal. Due to the short H/2 group delay time of the first comb filter, the chrominance output of this circuit possesses excellent phase stability and is free of hue irregularities. Due to the superior spurious output characteristics of the second comb filter, the chrominance output has good vertical resolution and can create a color picture free of vertical color smear.

9 Claims, 4 Drawing Sheets

PLAYBACK COLOR PROCESSING CIRCUIT

BACKGROUND OF THE INVENTION

This invention relates to a playback color processing circuit for a video tape recorder, more particularly to a color processing circuit possessing good vertical resolution and phase stability.

Video tape recorders are widely employed professionally and in the home for recording video signals on magnetic tape and playing them back. A video signal comprises a chrominance signal containing color information and a luminance signal containing brightness information. To enable a video tape recorder to handle the wide range of frequencies in a video signal, the chrominance signal, which has a carrier frequency of 3.58 MHz, is down-shifted to a lower frequency when it is recorded on the tape and up-shifted to its original frequency when played back. These frequency conversions are performed in the color processing circuits of the video tape recorder.

The playback color processing circuit thus receives a down-shifted chrominance signal and generates a chrominance output signal which has been restored to its original frequency. The playback color processing circuit includes an automatic phase control loop that locks the chrominance output signal in phase with a reference signal. As part of this loop, the color processing circuit has filters that remove unwanted frequency components from the chrominance signal and cancel crosstalk arising from adjacent tracks on the tape. To cancel crosstalk, prior-art color processing circuits generally use a simple comb filter comprising a single 1H delay line. (The symbol 1H denotes one horizontal cycle of the video signal; that is, the time from one horizontal sync pulse to the next.)

A problem with the use of this simple type of comb filter is that it degrades the vertical resolution of the circuit. Specifically, when chrominance is present in one raster line but not the next, the comb filter generates a spurious output signal in the next line with half the amplitude of the preceding chrominance signal. On the screen, this causes the color to appear smeared down into the next line.

A proposed solution to this problem employs a comb filter comprising a pair of 1H delay lines and other components interconnected in such a way as not to generate spurious output. This comb filter solves the vertical color resolution problem. However, it introduces a new problem in that the double delay slows the response of the automatic phase control loop. This leads to phase instability, which causes irregularities in hue.

SUMMARY OF THE INVENTION

It is accordingly an object of the present invention to provide a playback color processing circuit for a video tape recorder that possesses both good phase stability and good vertical color resolution.

A playback color processing circuit according to this invention receives a down-shifted chrominance signal and a horizontal sync signal and generates a chrominance output signal, and includes:

a first frequency converter for receiving the down-shifted chrominance signal and a cw signal and mixing them to generate a carrier chrominance signal;

a bandpass filter for receiving the carrier chrominance signal and removing unwanted frequency components therefrom, thus generating a band-limited chrominance signal;

a first comb filter comprising a first 1H delay line for receiving the band-limited chrominance signal from the bandpass filter and delaying it by one horizontal cycle, and first combining means for combining the band-limited chrominance signal with the output of the first 1H delay line to generate a crosstalk-free chrominance signal;

a burst separator for receiving the crosstalk-free chrominance signal and amplifying the burst component thereof, thus generating a burst signal;

an oscillator for generating a reference signal;

a phase detector for receiving the burst signal and the reference signal, detecting their phase difference, and generating a voltage signal proportional to the phase difference;

a voltage-controlled oscillator for receiving this voltage signal and generating an output signal the frequency of which is responsive to the voltage signal;

a second frequency converter for receiving the signal output by the voltage-controlled oscillator and the horizontal sync signal and mixing them to generate the cw signal mentioned above; and a second comb filter comprising a second 1H delay line for receiving the band-limited chrominance signal from the bandpass filter and delaying it by one horizontal cycle, a third 1H delay line for receiving the output of the second 1H delay line and delaying it by one further horizontal cycle, and second combining means for combining the band-limited chrominance signal with the outputs of the second and third 1H delay lines to generate the chrominance output signal.

DETAILED DESCRIPTION OF THE EMBODIMENTS

Figure 1:
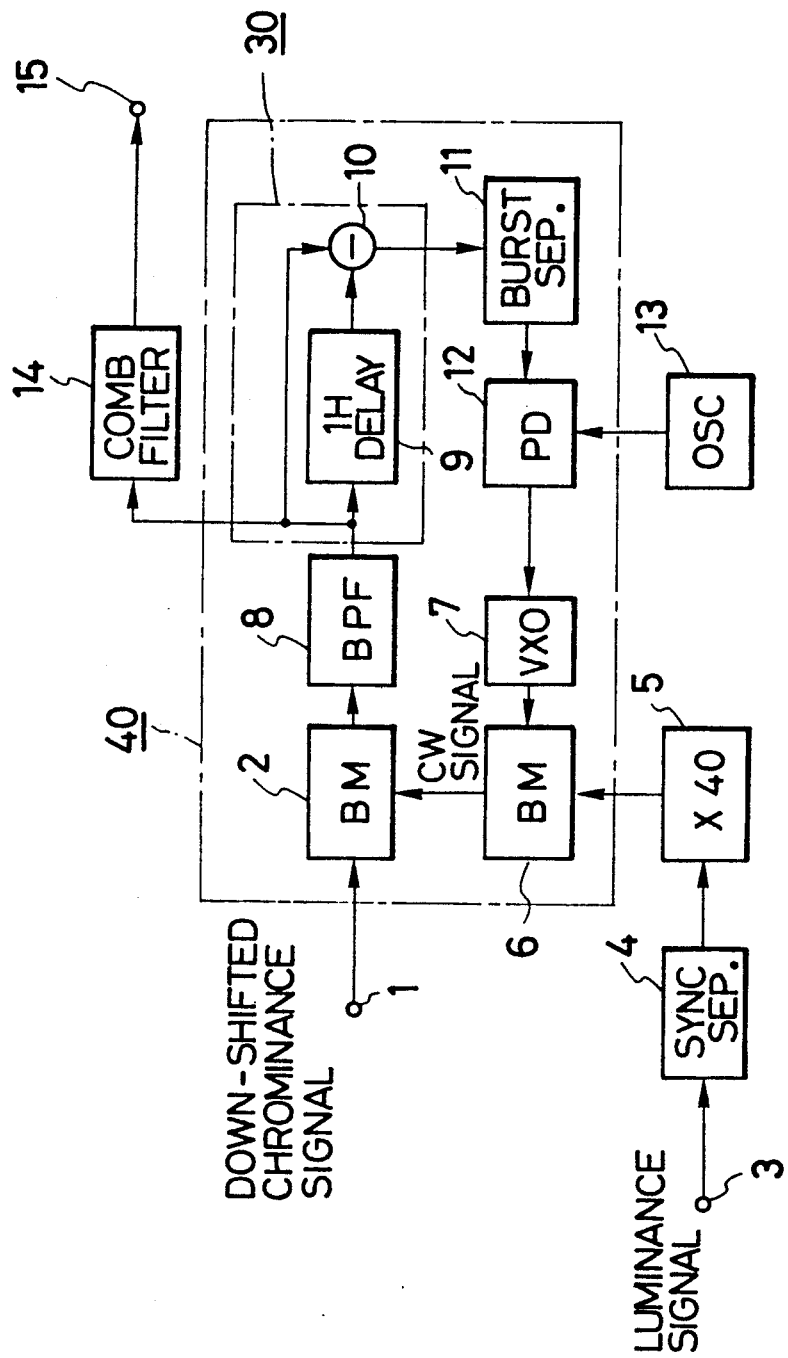
FIG. 1 is a block diagram of a color processing circuit according to this invention.

FIG. 1 is a block diagram of a novel playback color processing circuit according to this invention, which receives a down-shifted chrominance signal and a horizontal sync signal and generates a chrominance output signal.

The down-shifted chrominance signal is received at an input terminal 1 and fed to a first frequency converter 2, which mixes it with a cw signal to be described later, thus generating a carrier chrominance signal. A luminance signal is received at an input terminal 3 and fed to a sync separator 4. The sync separator 4 extracts the horizontal sync signal from the luminance signal and feeds it to a multiplier 5, which multiplies it by 40 and supplies the result to a second frequency converter 6. The second frequency converter 6 also receives the output of a voltage-controlled oscillator 7. By mixing this output with the horizontal sync signal received from the multiplier 5, the second frequency converter 6 generates the cw signal supplied to the first frequency converter 2 as described above.

The carrier chrominance signal output by the first frequency converter 2 is fed to a bandpass filter 8 which removes unwanted frequency components, thus generating a band-limited chrominance signal. The band-limited chrominance signal is supplied to a first 1H delay line 9 that delays it by one horizontal cycle, and to a subtractor 10. The subtractor 10 also receives the output of the first 1H delay line 9, which it subtracts from the band-limited chrominance signal to generate a crosstalk-free chrominance signal. Together, the first 1H delay line 9 and the subtractor 10 form a first comb filter 30.

The crosstalk-free chrominance signal produced by this first comb filter 30 is fed to a burst separator 11 which amplifies the burst component therein to generate a burst signal. This burst signal is applied to a phase detector 12, which also receives a reference signal output by an oscillator 13, detects the phase difference between the burst signal and the reference signal and generates a voltage signal, corresponding to the phase difference, which is applied to the voltage-controlled oscillator 7 and controls the frequency of the oscillator output signal supplied to the second frequency converter 6.

The novel playback color processing circuit also includes a second comb filter 14 which receives the band-limited chrominance signal from the bandpass filter 8 and filters it to remove crosstalk, thus generating a chrominance output signal. This chrominance output signal is supplied to the output terminal 15 as the output of the playback color processing circuit.

The first frequency converter 2, the second frequency converter 6, the voltage controlled oscillator 7, the bandpass filter 8, the first 1H delay line 9, the subtractor 10, the burst separator 11, the phase detector 12, and the oscillator 13 are well-known devices, and the circuit comprising these devices forms a well-known automatic phase control means 40.

The operation of the novel playback color processing circuit can be briefly described as follows. The down-shifted chrominance signal received at the input terminal 1 has a frequency of substantially $40f_H$, where $f_H$ denotes the horizontal sync frequency of the video signal, and contains the color information from the track currently being scanned on the tape as well as a certain amount of crosstalk from adjacent tracks. The output of the voltage-controlled oscillator 7 has a frequency of substantially 3.58 MHz. The second frequency converter 6 mixes this 3.58 MHz signal with a $40f_H$ signal received from the multiplier 5 to generate a cw signal having a frequency component of 3.58 MHz$+40f_H$. The first frequency converter 2 mixes this cw signal with the down-shifted chrominance signal received from the input terminal 1 to generate a carrier chrominance signal having a carrier frequency of substantially 3.58 MHz. Other, unwanted frequencies are rejected by the bandpass filter 8, which thus creates a band-limited chrominance signal. This band-limited chrominance signal is provided as feedback through the burst separator 11 and phase detector 12 to the voltage-controlled oscillator 7, to hold the output frequency of the voltage-controlled oscillator 7 at 3.58 MHz and lock the phase of the burst signal in phase with the reference signal. For correct operation of this automatic phase control loop it is necessary to cancel adjacent-track crosstalk in the signal. This is the function of the comb filter 30. The band-limited chrominance signal is also fed to the output terminal 15 of the playback color processing circuit through the second comb filter 14. Adjacent-track crosstalk must also be canceled in this output signal; this is the function of the second comb filter 14.

Figure 2:
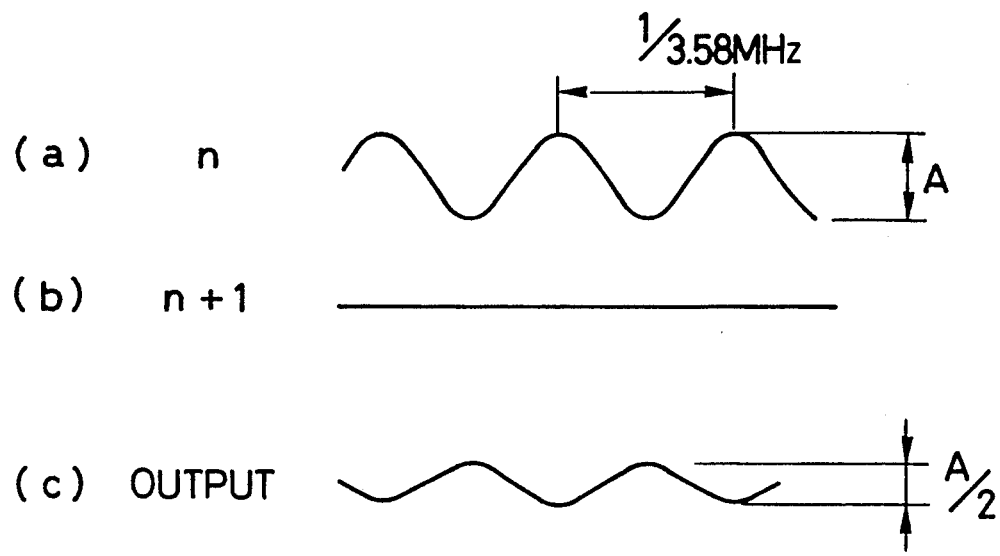
FIG. 2 describes the operation of the first comb filter in FIG. 1.

Since quick response is required in the automatic phase control loop, the first comb filter 30 has a simple structure, comprising the first 1H delay line 9 and subtractor 10, which can be represented mathematically by the transfer function $1-e^{-j2\pi fH}$ (where f denotes frequency and H is one horizontal cycle) and which has a short group delay time of H/2. FIG. 2 illustrates the operation of the comb filter 30 for the case in which a chrominance signal (a) with amplitude A is present in raster line n, but no chrominance (b) is present in raster line n+1. A spurious chrominance signal (c) with amplitude A/2 is generated as the output signal for raster line n+1. It is this spurious signal that degrades vertical resolution in prior-art color processing circuits in which the output of the first comb filter 30 is also the chrominance output signal of the color processing circuit. The spurious signal does not, however, impair the performance of the automatic phase control feedback loop.

In the chrominance output signal, response speed is not such a critical factor but it is important to avoid spurious output like that illustrated in FIG. 2. To meet this requirement, the second comb filter 14 in FIG. 1 comprises a pair of 1H delay lines, which results in a longer group delay but provides means of eliminating most or all of the spurious output. This thus generates a chrominance output signal with good vertical resolution. Two examples of possible designs for the second comb filter 14 will be described next.

Figure 3:
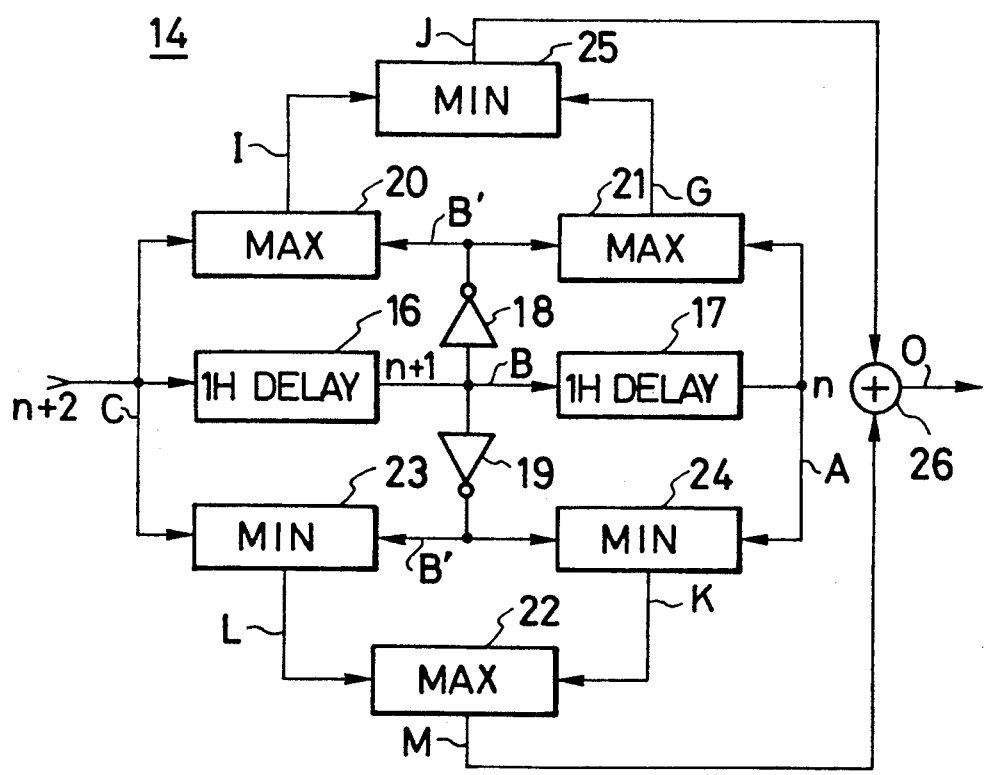
FIG. 3 is a block diagram of a comb filter that can be used as the second comb filter in FIG. 1.

FIG. 3 illustrates one possible configuration of the comb filter 14, comprising a second 1H delay line 16, a third 1H delay line 17, a first inverter 18, a second inverter 19, first, second, and third MAX circuits 20, 21, and 22 which are operational circuits that select the higher of two input signals, first, second, and third MIN circuits 23, 24, and 25 which are operational circuits that select the lower of two input signals, and an adder 26.

Figure 4:
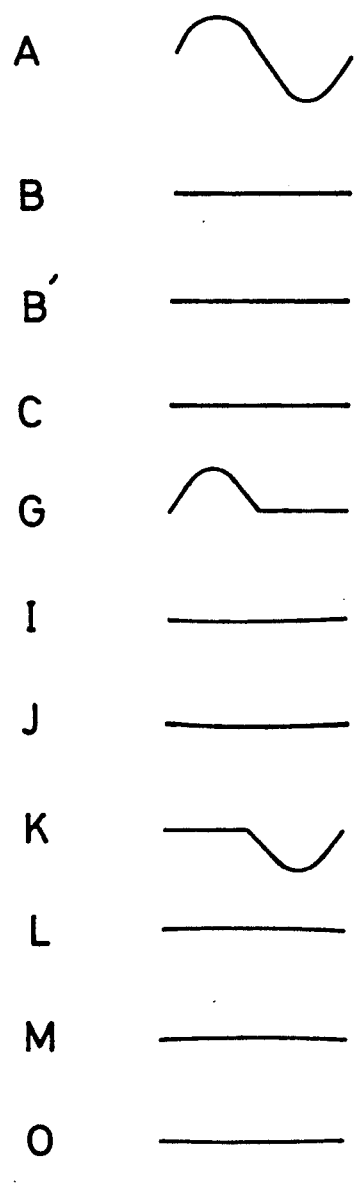
FIG. 4 describes the operation of the comb filter in FIG. 3.

The band-limited chrominance signal from the bandpass filter 8 in FIG. 1 is supplied to the second 1H delay line 16, the first MAX circuit 20, and the first MIN circuit 23. The output of the second 1H delay line 16 is supplied to the third 1H delay line 17 and the inverters 18 and 19. The output of the third 1H delay line 17 is supplied to the second MAX circuit 21 and the second MIN circuit 24. The output of the first inverter 18 is supplied to the first and second MAX circuits 20 and 21. The outputs of the first and second MAX circuits 20 and 21 are supplied to the third MIN circuit 25. The output of the second inverter 19 is supplied to the first and second MIN circuits 23 and 24. The outputs of the first and second MIN circuits 23 and 24 are supplied to the third MAX circuit 22. The adder 26 adds the outputs of the third MAX circuit 22 and the third MIN circuit 25 to produce the output signal of the comb filter FIG. 4 illustrates the operation of the circuit in FIG. 3 when chrominance is present in the input signal A for raster line n but not in the input signals B and C for raster lines n+1 and n+2. At time n+2 the output G of the second MAX circuit 21 is the higher of two signals: the input A at time n and the inversion B' of the input B' at time n+1. The output I of the first MAX circuit 20 is the higher of two signals: the input C at time n+2 and the inversion B' of the input B' at time n+1. The output K of the second MIN circuit 24 is the lower of two signals: the input A at time n and the inversion B' of the input B at time n+1. The output L of the first MIN circuit 23 is the lower of two signals: the input C at time n+2 and the inversion B' of the input B at time n+1. The output J of the third MIN circuit 25 is the lower of G and I. The output M of the third MAX circuit 22 is the higher of K and L. The output O of the adder 26 is the sum of J and M. It is clear that the output O is free of spurious contamination from the chrominance in raster line n. This circuit accordingly does not degrade vertical resolution.

Figure 5:
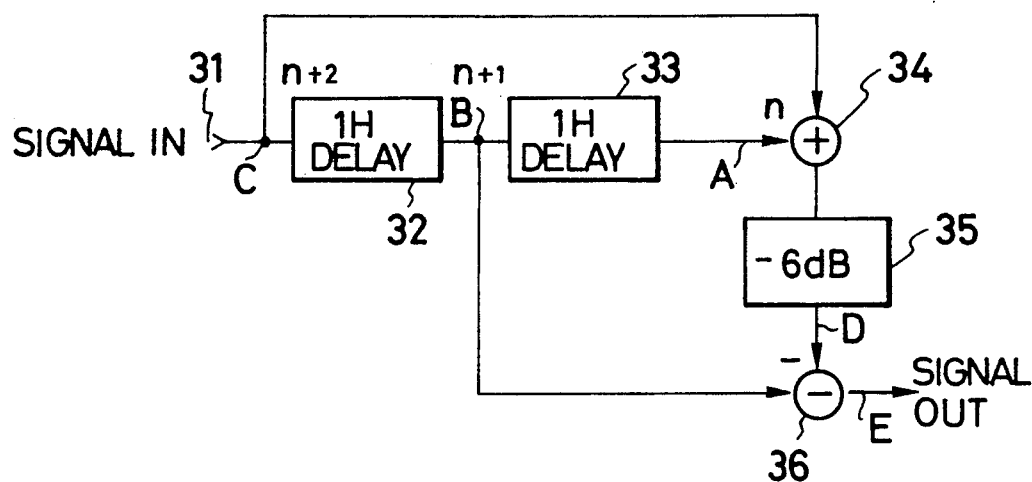
FIG. 5 is a block diagram of another comb filter that can be used as the second comb filter in FIG. 1.

FIG. 5 shows another, simpler circuit that can be used as the comb filter 14 in FIG. 1. This circuit comprises an input terminal 31, a second 1H delay line 32, a third 1H delay line 33, an adder 34, a 6 dB attenuator 35, and a subtractor 36. The band-limited chrominance signal received at the input terminal 31 is supplied to the second 1H delay line 32 and the adder 34. The output signal of the second 1H delay line 32 is supplied to the third 1H delay line 33 and the subtractor 36. The adder 34 adds the output of the third 1H delay line 33 to the original band-limited chrominance signal. The output of the adder 34 is attenuated by the attenuator 35 and supplied to the subtractor 36, which subtracts it from the output of the second 1H delay line 33 to generate the final output of the comb filter 14.

Figure 6:
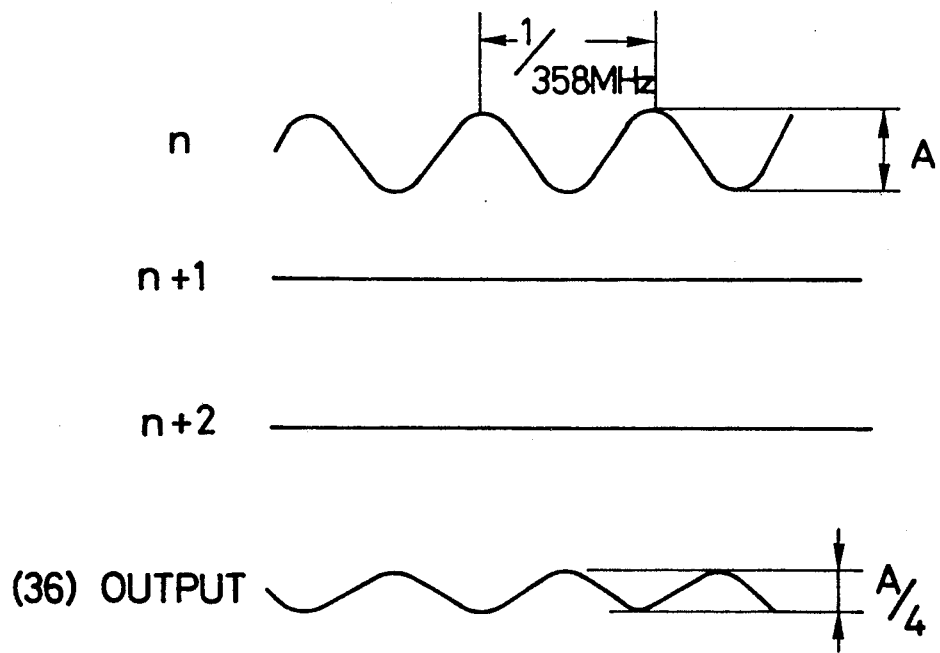
FIG. 6 describes the operation of the comb filter in FIG. 5.

FIG. 6 illustrates the operation of the circuit in FIG. 5 for the case in which chrominance is present in raster line n but not in the next two raster lines. The chrominance signal in line n is added to the signal in line n+2, but then attenuated by 6 dB before being subtracted from the signal in line n+1. As a result, a spurious signal is generated that causes some degradation of the vertical resolution, but the degradation is relatively small. If the input chrominance amplitude is A, the spurious output chrominance amplitude is only A/4. If this level of degradation of vertical resolution is acceptable, the circuit in FIG. 5 offers the advantage of simplicity over the circuit in FIG. 3.

By providing both a first comb filter with a short delay time for automatic phase control and a second comb filter with a longer delay time but better spurious output characteristics for canceling crosstalk in the output chrominance signal. This invention is able to solve the problem of degradation of vertical resolution without impairing the stability of automatic phase control. Thereby the quality of the chrominance signal is markedly improved.

The scope of this invention is not limited to the circuits shown in the drawings, but covers various modifications which will be obvious to one skilled in the art. For example, the circuits described above are suitable for magnetic recording and playback apparatus employing the NTSC system, but they can easily be adapted to the CCIR system by alteration of the delay of the comb filter 14.

What is claimed is:

1. A color processing circuit having an automatic phase control circuit configured to lock the frequency and phase of a color burst signal in a carrier chrominance signal with the output signal of a reference oscillator, comprising:
   first crosstalk canceling means for receiving input of the carrier chrominance signal, including crosstalk from adjacent tracks, and for canceling the crosstalk in at least the burst signal portion in said carrier chrominance signal and generating an output signal; and
   second crosstalk canceling means, connected in parallel with said first crosstalk canceling means, for canceling crosstalk in said carrier chrominance signal and generating a crosstalk-free chrominance output signal;
   wherein the output signal of the first crosstalk canceling means is supplied through the automatic phase control means; and
   wherein the delay time of the first crosstalk canceling means is set shorter than the delay time of the second crosstalk canceling means to ensure proper response speed within the automatic phase control circuit.

2. A color processing circuit for receiving a downshifted chrominance signal and a horizontal sync signal and generating a chrominance output signal, comprising:
   first frequency converter means for receiving said downshifted chrominance signal and a cw signal and for mixing the signals to generate a carrier chrominance signal;
   bandpass filter means for receiving said carrier chrominance signal and for removing unwanted frequency components therefrom, to generate a band-limited chrominance signal;
   first comb filter means including first 1H delay means for receiving said band-limited chrominance signal from said bandpass filter means and for delaying it by one horizontal cycle, and first combining means for combining said band-limited chrominance signal with the delayed signal of said 1H delay means to generate a crosstalk-free chrominance signal;
   burst separator means for receiving said crosstalk-free chrominance signal and for amplifying the burst component thereof, to generate a burst signal;
   oscillator means for generating a reference signal;
   phase detector means, receiving said burst signal and said reference signal, for detecting their phase difference, and for generating a voltage signal proportional to said phase difference;
   voltage-controlled oscillator means for receiving said voltage signal and for generating an output signal, the frequency of which is responsive to said voltage signal;
   second frequency converter means for receiving the output signal of said voltage-controlled oscillator and said horizontal sync signal and for mixing them to generate said cw signal; and
   second comb filter means including second 1H delay means for receiving said band-limited chrominance signal from said bandpass filter means and for delaying it by one horizontal cycle, third 1H delay means for receiving the delayed signal of said second 1H delay means and delaying it by one further horizontal cycle, and second combining means for combining said band-limited chrominance signal with the twice delayed signal of said third 1H delay means to generate said chrominance output signal.

3. A color processing circuit according to claim 2, wherein said first combining means comprises a subtractor for subtracting the delayed signal of said first 1H delay means from said band-limited chrominance signal.

4. A color processing circuit according to claim 2, wherein said second combining means comprises:
   inverting means for receiving and inverting the delayed signal of said second 1H delay means;

first MAX circuit means for receiving said band-limited chrominance signal and the inverted signal of said inverting means and for selecting the higher of the signals as its output;

second MAX circuit means for receiving the inverted signal of said inverting means and the delayed signal of said third 1H delay means and for selecting the higher of the signals as its output;

first MIN circuit means for receiving said band-limited chrominance signal and the inverted signal of said inverting means and for selecting the lower of the signals as its output;

second MIN circuit means for receiving the inverted signal of said inverting means and the delayed signal of said third 1H delay means and for selecting the lower of the signals as its output;

third MIN circuit means for receiving the outputs of said first MAX circuit means and said second MAX circuit means and for selecting the lower of the signals as its output;

third MAX circuit means for receiving the outputs of said first MIN circuit means and said second MIN circuit means and for selecting the higher of the signals as its output; and adder means for receiving the outputs of said third MIN circuit means and said third MAX circuit means and for adding them to generate said chrominance output signal.

5. A color processing circuit according to claim 2, wherein said second combining means comprises:

adder means for receiving said band-limited chrominance signal and the delayed signal of said third 1H delay means and for adding them to generate a sum signal;

attenuator means for attenuating said sum signal; and subtractor means for receiving the attenuated signal of said attenuator means and the delayed signal of said second 1H delay means and for substracting the attenuated signal of said attenuator means from the delayed signal of said second 1H delay means to generate said chrominance output signal.

6. A color processing circuit according to claim 5, wherein said attenuator means has an attenuation factor of about 6dB.

7. A playback color processing circuit for a video tape recorder which possesses phase stability and generates a crosstalk-free output signal providing proper vertical color resolution, comprising:

automatic phase control means for generating a carrier chrominance signal from an input chrominance signal, said automatic phase control means including, first comb filter means, including a first delay means, for generating a crosstalk-free carrier chrominance signal from said carrier chrominance signal; and second comb filter means, including a second delay means, for generating a crosstalk-free output signal from said carrier chrominance signal, said first delay means being set for a shorter period of time delay than that of said second delay means, thus allowing the automatic phase control means to operate with a quick response time required to avoid phase instability and allowing for generation of said crosstalk-free output signal which provides proper vertical color resolution.

8. A color processing circuit, for use in a playback device, which maintains phase stability of an input chrominance signal to avoid irregularities in hue during playback and generates a crosstalk-free output signal which provides proper vertical color resolution during playback, said circuit comprising:

automatic phase control means for generating a carrier chrominance signal from an input chrominance signal, said automatic phase control means including, first crosstalk cancelling means, including a first delay means of a first predetermined delay time, for generating a crosstalk-free carrier chrominance signal from said carrier chrominance signal, said first predetermined delay time of said first delay means being short enough to allow said automatic phase control means to operate with a quick response time required to avoid phase instability; and second crosstalk cancelling means, including a second delay means of a second predetermined delay time, for generating said crosstalk-free output signal from said carrier chrominance signal, said second predetermined delay time being longer than said first predetermined delay time to generate said crosstalk-free output signal which provides proper vertical resolution during playback.

9. A method for generating a crosstalk-free output signal, from an input downshifted chrominance signal and a horizontal sync signal, which provides proper vertical color resolution during playback on a playback device, comprising the steps of:

a) receiving the downshifted chrominance signal and a cw signal and mixing the signal to generate a carrier chrominance signal;

b) receiving the carrier chrominance signal and removing unwanted frequency components therefrom, to generate a band-limited chrominance signal;

c) receiving the band-limited chrominance signal in a first comb filter and delaying it by one horizontal cycle;

d) combining the band-limited in the first comb filter chrominance signal with the delayed signal in the first comb filter to generate a crosstalk-free chrominance signal;

e) receiving the crosstalk-free chrominance signal and amplifying the burst component thereof, to generate a burst signal;

f) generating a reference signal in an oscillator;

g) receiving the burst signal and the reference signal, detecting their phase difference, and generating a voltage signal proportional to the phase difference;

h) receiving the voltage signal and generating an output signal, the frequency of which is responsive to the voltage signal;

i) receiving the signal output by the voltage-controlled oscillator and the horizontal sync signal and mixing them to generate the cw signal; and j) receiving the band-limited chrominance signal in a second comb filter receiving the band-limited chrominance signal in a second comb filter, delaying it by one horizontal cycle, and delaying it by one further horizontal cycle;

k) combining the band-limited chrominance signal with the twice delayed signal in the second comb filter to generate the crosstalk-free output signal which provides proper vertical color resolution during playback on a playback device.

* * * * *